Feb. 19, 1957  J. W. HUGHES  2,781,924
HYDRAULIC PIPE LOADING APPARATUS FOR VEHICLES
Filed July 11, 1955  2 Sheets-Sheet 1

INVENTOR
J.W. HUGHES
BY  J. H. McCarthy
HIS AGENT

Feb. 19, 1957 J. W. HUGHES 2,781,924
HYDRAULIC PIPE LOADING APPARATUS FOR VEHICLES
Filed July 11, 1955 2 Sheets-Sheet 2

INVENTOR
J. W. HUGHES
BY J. H. McCarthy
HIS AGENT

United States Patent Office 2,781,924
Patented Feb. 19, 1957

2,781,924
HYDRAULIC PIPE LOADING APPARATUS FOR VEHICLES

John Wallace Hughes, Midland, Tex., assignor to Shell Development Company, New York, N. Y., a corporation of Delaware Application July 11, 1955, Serial No. 521,157

3 Claims. (Cl. 214—77)

This invention relates to pipe handling equipment and pertains more particularly to an apparatus adapted to pick up lengths of long and heavy pipe such as are used in oil field operations, and to load these pipe lengths on a truck and/or trailer for transporting them to a desired location.

In the pipe industry, and in other industries wherein long and heavy lengths of pipe are transported and handled in large quantities, such as the oil industry, the pipe is ordinarily stacked on pipe racks which are normally at ground level. Pipe is ordinarily transported to and from the pipe racks on a truck or other vehicle having a pipe-bed positioned at a materially different level, usually higher, than the level of the pipe racks. While trucks with hoisting equipment have been used to load and unload the pipe, a majority of the pipe loading operations is still effected by hand.

The loading of a truck by hand is facilitated by the use of two large timber skids. The skids, weighing about 150 pounds each, are placed with one end on the ground or on the pipe rack and the other end on each of the pipe-supporting bolsters positioned transversely on the truck and its trailer. To load the truck, lengths of the pipe are rolled up the skids and onto the truck by hand. In rolling large-diameter pipe, drill pipe, or drill collars, as many as eight men may be required. As the height of the truck load increases, the height of the stockpile decreases, thus increasing the angle of the inclination of the skids. With this condition it becomes increasingly more difficult to load each section of pipe. In order to place sections of pipe on top of the load, it is sometimes necessary to roll the pipe up the skids as far as the men on the ground can reach, while additional men climb onto the top of the load and pull the pipe up the remaining distance onto the truck. This method of loading pipe onto a truck is both cumbersome and unsafe.

It is therefore a primary object of this invention to provide an apparatus that eliminates the use of most of the manual labor now required in loading pipe from a pipe rack onto a vehicle bed.

Another object of this invention is to provide a pipe loading apparatus adapted to be readily assembled on a pipe transporting vehicle and disassembled therefrom with a minimum of labor.

A further object of this invention is to provide a pipe loading mechanism for loading pipe onto a vehicle in a manner such that the operator is not required to stand in the danger zone of the loading operations.

It is also another object of this invention to provide a pipe loading mechanism adapted to be secured to and positioned adjacent a pipe transporting vehicle so that heavy lengths of pipe may be loaded on the vehicle either from the left side or the right side thereof.

A further object of this invention is to provide a hydraulic pipe loading apparatus for raising heavy lengths of pipe from the ground level to the varying heights above a pipe-carrying vehicle as the load thereon increases in height.

Yet another object of this invention is to provide a hydraulic pipe loading device for use on a truck and trailer in which a load of heavy pipe is to be placed with one end of the load resting on the truck and the other end of the load resting on the trailer.

A further object of this invention is to provide a hydraulic pipe loading apparatus adapted to raise heavy lengths of pipe from the ground level to a position above a pipe-carrying vehicle and to roll the pipe onto the top of the load without dropping it thereon.

These and other objects of this invention will be understood from the following description taken with reference to the drawing, wherein.

Figure 2:
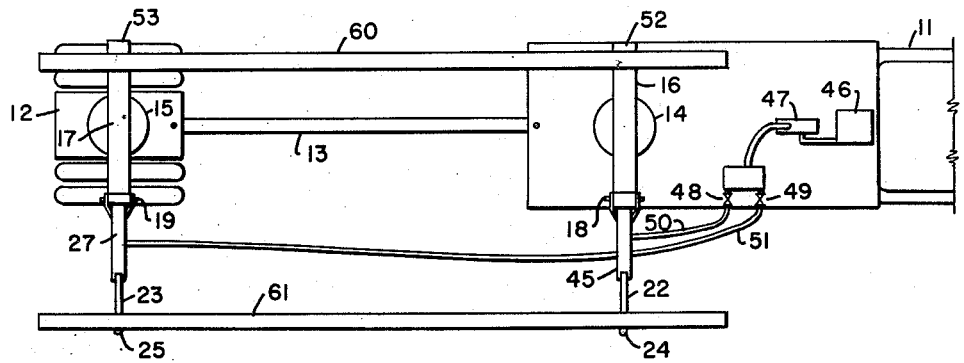
Figure 2 is a plan view of Figure 1.
Figure 1:
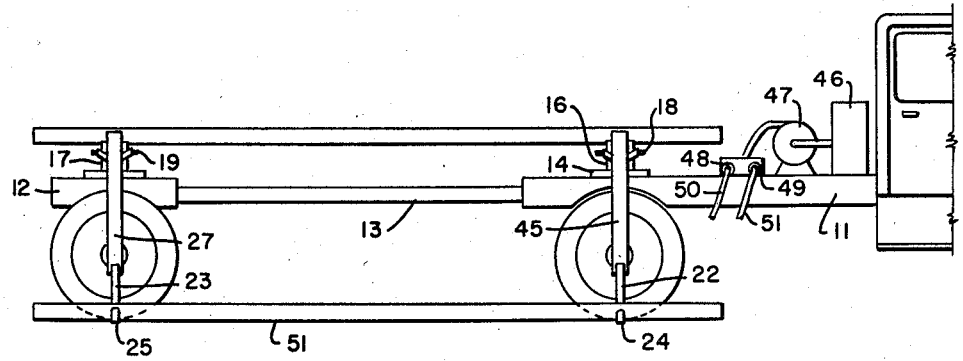
Figure 1 is a side elevation view of a preferred embodiment of the present hydraulic pipe loading apparatus mounted on one side of a truck and trailer for loading pipe thereon.

Referring to Figures 1 and 2, the drawings illustrate loading sections of pipe on a truck 11 having a single axle trailer 12 attached to the rear end thereof by means of a tongue 13. The truck and trailer are provided with bearing discs 14 and 15, respectively, which support bolsters 16 and 17 upon which pipe is to be loaded.

Figure 4:
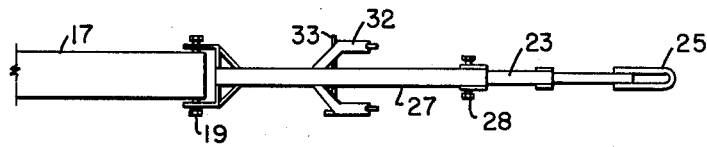
Figure 4 is a plan view of the loading boom shown in Figure 3.

Depending on the side of the truck and trailer from which pipe is to be loaded, there is hinged to one end of the bolsters 16 and 17, as by hinge pins 18 and 19, a pair of loading booms 22 and 23 which are adapted to slope downwardly from the end of the bolsters 16 and 17 to the ground level, as shown in Figs. 1 and 4. The outermost ends of the booms 22 and 23 are provided with curved spades 24 and 25. The outer portion of each of the loading booms 22 and 23 is preferably of extensible or telescoping construction, so that the boom may be adjusted to any desired length depending upon the loading condition. The telescoping section of the boom, including space 25, may be fixedly anchored at a set position by means of a set screw or anchoring pin 26 (Figure 3).

Figure 3:
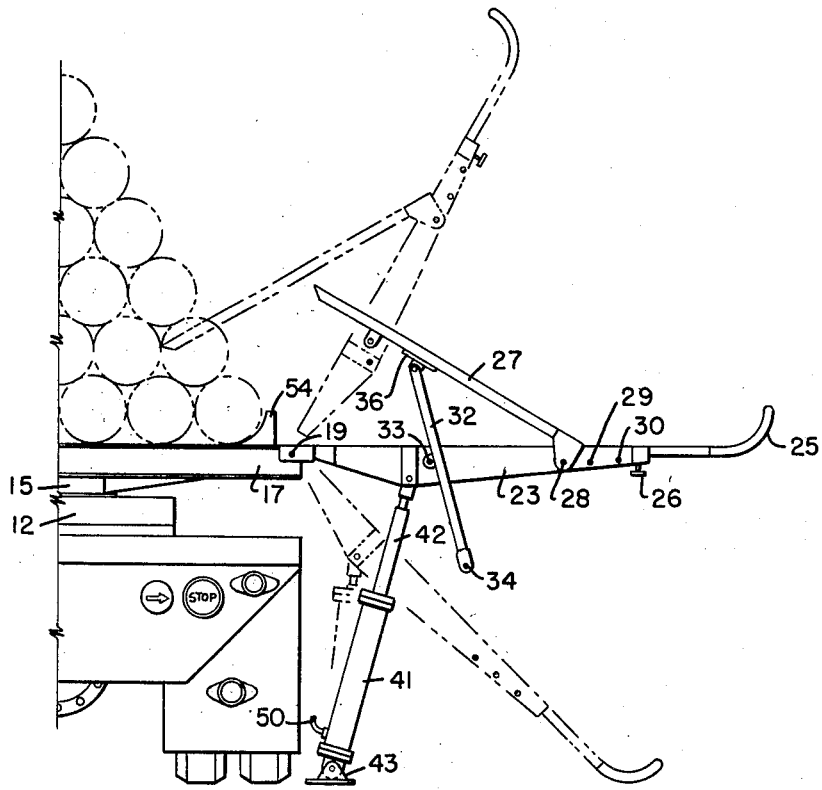
Figure 3 is a side elevation view of one of the booms of the present hydraulic pipe loading device, the loading boom being shown in full lines in its horizontal position and in broken lines at its lowermost position and at a partly elevated position.

As shown in Figure 3, the boom 23 is provided with a bridge element 27 which is hinged to the boom, as by a hinge pin 28. The boom is preferably further provided with holes 29 and 30 which are adapted to receive the hinge pin 28 when it is desired to set the bridge 27 at a different position. The bridge 27 is also provided with an adjustable bridge support bar element 32 which is preferably bifurcated in shape, as shown in Figure 4, so as to extend on both sides of the boom 23. The bridge support element 32 is hinged to the boom 23 by means of a hinge pin 33. As shown in Figure 3, the bridge support element 32 is hinged to the boom 23 about midway the length of the bridge element, but the bridge support element 32 is preferably provided with at least another hole 34 in the extended end thereof which is adapted to receive the hinge pin 33 when it is desired to change the angle of inclination of the bridge 27.

Figure 5:
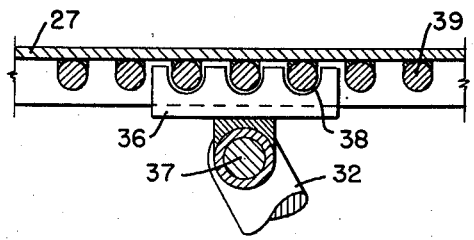
Figure 5 is a cross-section view in enlarged detail showing the connection between the bridge support and the boom.

The angle of the bridge 27 may be further changed by pre-selecting the desired point at which the bridge support 32 contacts the bridge 27. As shown in Figure 5 of the drawing the bridge support element 32 is provided at its upper end with a shoe 36 which is pivotally secured to the bridge support 32 by means of a pin 37. The upper surface of the shoe 36 is provided with one or more horizontal grooves 38 which are spaced so as to contain short cylindrical rod elements 39 which are welded to the lower side of the bridge 27. When it is desired to change the angle between the bridge 27 and the boom 23 with the bridge support element 32 pinned at a fixed position 33 as shown in Figure 3, the bridge 27 is merely raised so that the rod elements 39 on the bottom of the bridge disengage the grooved shoe 36 and then the bridge support element 32 is pivoted in one direction or the other after which bridge 27 is again lowered to engage the shoe 36 at a new position.

A hydraulic cylinder 41 having an extensible piston arm 42 is positioned below the pipe lifting boom 23 and pivotally secured thereto, as by a hinge or ball and socket joint carried at the end of said piston arm. The hydraulic cylinder 41 is preferably hinged to a base plate 43 so that the cylinder 41 may change position slightly as the piston 42 is forced therefrom to raise the loading boom 23. The hydraulic cylinder 41 is preferably disposed on the ground beside the truck or the trailer so as to obtain better leverage and a greater angle of elevation for the boom 23, but in some cases the base plate 43 may be secured at a low level to the truck or trailer.

As shown in Figures 1 and 2, the boom 22 which is secured to the bolster 16 mounted on the bed of the truck is provided with the same component parts as the boom 23 previously described, which parts include an adjustable bridge 45 hinged to the boom 22 and a hydraulic cylinder (not shown) for lifting the boom 22 in independent or synchronized movement with the boom 23. Pressure fluid is supplied to the lifting jacks or hydraulic cylinders by any suitable type of a hydraulic pressure system which may include a fluid reserve tank 46, a pump 47 that may be actuated by power from the truck, and control valves 48 and 49 so that the hydraulic pressure fluid may be controlled independently as it is delivered through hydraulic lines 50 and 51 to the hydraulic lift cylinders positioned beneath each of the lifting booms 22 and 23.

In operation the truck or trailer onto which the pipe is to be loaded, is rolled in position adjacent a stack of pipe. The pipe loading equipment of the present invention may be readily attached to the trailer simply by inserting hinge pins 18 and 19 through the ends of the booms 22 and 23 to connect them to the ends of the bolsters 16 and 17 upon which the pipe is to rest. The hydraulic cylinders 51 are then hinged to the booms 22 and 23 and the hoses 50 and 51 are connected to the hydraulic pressure system which is either carried by the truck or available in the pipe supply yard. With the booms 22 and 23 operatively connected to the trailer bolsters 16 and 17, they are lowered so that the spades 24 and 25 thereof contact the ground.

A section of pipe 51 (Figure 1) is rolled into position on the spaces 24 and 25. The operator then opens valves 48 and 49 simultaneously to supply pressure fluid through hoses 50 and 51 to the hydraulic cylinders 41 positioned beneath the booms 22 and 23 of the hydraulic pipe loading apparatus. By proper adjustment of the valves 48 and 49 the booms 22 and 23 may be quickly raised simultaneously to a horizontal position as shown in Figure 3. Further application of hydraulic pressure causes further elevation of the booms 22 and 23 so that the section of the pipe 51 rolls down the booms and onto the bolsters 16 and 17 to the far side of the bolsters where they are stopped by blocks 52 and 53 (Figure 2). In Figures 1 and 2 the truck and trailer are shown with one section of pipe 60 positioned in place on the bolsters 16 and 17 while a second section of pipe 61 is positioned on the spades 24 and 25 of the booms 22 and 23. During the loading of the first layer of pipe on the bolsters 16 and 17, the bridges 45 and 27 of the booms 22 and 23 are retracted so that they are parallel with and lie upon the tops of the booms. In the event that the bolsters or truck bed are provided with permanent pipe retaining blocks 54 (Figure 3), the bridges 45 and 27 of the booms 22 and 23 may be raised slightly at a small angle to the booms so that the pipe sections will roll over the pipe block 54 when the first layer of pipe is loaded onto the truck.

Prior to loading the next higher layer on the pipe already on the truck, the angle between the bridge 27 and the boom 23 (Figure 3) is changed by repositioning the shoe 36 underneath the bridge 27 so that sections of pipe upon rolling down the boom arm and inclined bridge 27 will roll onto the load at the level of the last layer of pipe loaded on the truck, thereby preventing any injury to the pipe joints by dropping the sections of pipe onto the load. Depending upon the height of the load being positioned on the trailer and depending upon the diameter of the pipe being loaded, it is at times necessary to change the setting of hinge pin 28 (Figure 3) to one of the other holes 29 or 30 to obtain the desired angle of the bridge. For topping off a load or loading the topmost layers of pipe onto the trailer, the bridge support bar element 32 can also be relocated so that it is hinged to the boom 23 at its lower end 34 which is secured to the boom by pin 33.

Thus it may be seen that, by use of the present hydraulic pipe loading equipment, the loads of heavy sections of pipe of any diameter may be placed on a truck in several layers to considerable height without the use of manual labor or supplementary equipment as is now required in most pipe loading systems. The present hydraulic pipe loader is also useful for loading pipe on railroad flat cars, pipe storage racks, trucks with flat beds, etc.

I claim as my invention:

1. Apparatus for transferring a load of pipe from a lower level onto the bed of a truck at a higher level, said apparatus comprising a pair of pipe-loading booms of a length greater than the height of the truck bed, said booms being hinged horizontally in spaced relationship to the same side of said truck bed for pivotal movement in a vertical plane, hydraulic jack means hinged to each of said booms for raising said booms so that they move from a position where the lower ends thereof touch the ground to a position where they extend above the truck, a hydraulic pressure-fluid system for actuating said hydraulic jack means, a bridge member hinged at one end thereof to one of said booms in a manner such that the free end of said bridge member is nearer the truck and movably adjustable in a vertical plane passing through said boom, bridge support means secured between each bridge and the boom connected thereto for adjustably positioning said bridge at a predetermined angle above said boom, whereby upon joint pivoted elevation of said loading booms carrying a pipe, the pipe rolls inwardly on said booms and said bridges to be discharged therefrom at the level of the uppermost layer of pipe already loaded on the truck.

2. Apparatus for transferring a load of pipe from a lower level onto the bed of a truck at a higher level, said apparatus comprising a pair of pipe-loading booms of a length greater than the height of the truck bed, said booms being hinged horizontally in spaced relationship to the same side of said truck bed for pivotal movement in a vertical plane, curved spade means at the extended ends of said booms for receiving a section of pipe thereon, hydraulic jack means hinged to each of said booms for raising said booms so that they move from a position where the lower ends thereof touch the ground to a position where they extend above the truck, a hydraulic pressure-fluid system for independently actuating each of said hydraulic jack means, a bridge member adjustably hinged at one end thereof to one of said booms in a manner such that the free end of said bridge member is nearer the truck and movably adjustable in a vertical plane passing through said boom, adjustable bridge support means secured between each bridge and the boom connected thereto for adjustably positioning said bridge at a predetermined angle above said boom, whereby upon joint pivoted elevation of said loading booms carrying a pipe, the pipe rolls inwardly on said booms and said bridges to be discharged therefrom at the level of the uppermost layer of pipe already loaded on the truck.

3. Apparatus for transferring a load of pipe from a lower level onto the bed of a truck and a trailer at a higher level, said apparatus comprising a pair of pipe-loading booms of a length greater than the height of the truck bed and trailer, said booms being hinged horizontally in spaced relationship to the same side of said truck bed and trailer for pivotal movement in a vertical plane, hydraulic jack means hinged to each of said booms for raising said booms so that they move from a position where the lower ends thereof touch the ground to a position where they extend above the truck and trailer, a hydraulic pressure-fluid system for actuating said hydraulic jack means, a bridge member hinged at one end thereof to one of said booms in a manner such that the free end of said bridge member is nearer the truck and movably adjustable in a vertical plane passing through said boom, bridge support means secured between each bridge and the boom connected thereto for adjustably positioning said bridge at a predetermined angle above said boom, whereby upon joint pivoted elevation of said loading booms carrying a pipe, the pipe rolls inwardly on said booms and said bridges to be discharged therefrom at the level of the uppermost layer of pipe already loaded on the truck and trailer.

References Cited in the file of this patent
UNITED STATES PATENTS

| | | |
|---|---|---|
| 2,194,125 | Rinehart | Mar. 19, 1940 |
| 2,483,758 | Douglas | Oct. 4, 1949 |
| 2,500,559 | Miller | Mar. 14, 1950 |
| 2,598,517 | Drott | May 27, 1952 |
| 2,617,547 | Pridy | Nov. 11, 1952 |
| 2,676,715 | Pridy | Apr. 27, 1954 |